Figure 1:
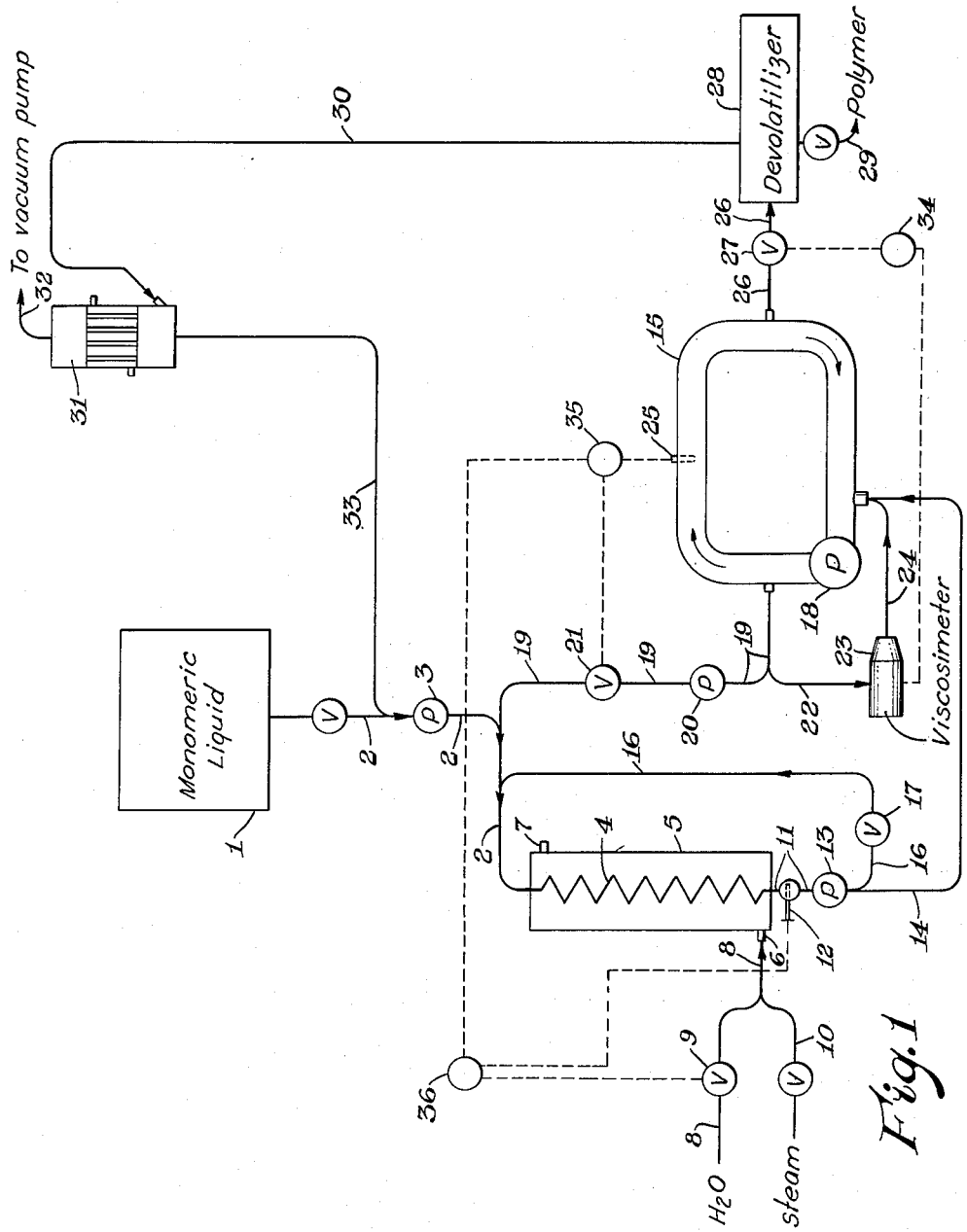

INVENTORS.
Alden W. Hanson
John S. Best

# 2,989,517
POLYMERIZATION METHOD

Alden W. Hanson and John S. Best, Midland, Mich., assignors to The Dow Chemical Company, Midland, Mich., a corporation of Delaware
Filed May 6, 1954, Ser. No. 427,999
7 Claims. (Cl. 260—93.5)

This invention pertains to an improved method, and certain arrangements of apparatus, for polymerizing vinylidene compounds in a continuous manner. It pertains especially to a combination of steps for maintaining a nearly constant set of reaction conditions within the polymerization zone while feeding monomeric material thereto and withdrawing the polymeric product. The invention is concerned especially with the production of normally solid thermoplastic polymers of substantially uniform quality by the polymerization of alkenyl aromatic compounds such as styrene, ar-vinyltoluene, or ar-chlorostyrene, etc., individually or in admixture with one another or with one or more other polymerizable vinylidene compounds such as ethyl acrylate, methyl methacrylate, or maleic anhydride, etc. The invention pertains, more particularly, to the polymerization in continuous manner of mixtures or solutions of two or more polymerizable vinylidene compounds to produce copolymers thereof which are of desired and predetermined composition and are exceptionally uniform both in composition and in molecular weight.

The method and apparatus arrangements of the invention are improvements over those disclosed in a copending application, Serial No. 245,834, filed September 10, 1951, of A. W. Hanson, one of the present applicants, now U.S. Patent No. 2,769,804, isssused November 6, 1956. It is well known that a conventional, e.g. batchwise, polymerization of one or more vinylidene compounds usually results in a mixture of polymers which vary from one another in molecular weight and, often, in chemical composition or in molecular structure. The individual polymers are not readily separable and the mixture of polymers is usually marketed or employed, as such. However, individual polymers, or mixtures of polymers which vary only slightly from one another in molecular weight and/or chemical composition, would in some instances be preferred.

It is evident that if all of the variable reaction conditions, e.g. of temperature, polymer concentration, total monomer concentration, and relative proportions of different monomers present when using a mixture of copolymerizable monomers, etc., could be maintained constant during a polymerization, a polymeric product substantially uniform both in molecular weight and in composition should be obtained. It is also evident that if sufficient information were available aforehand to permit choice of the necessary combination of such reaction conditions, and if all such variable reaction conditions could be maintained constant during a polymerization, a substantially uniform polymer of a desired, and predetermined, molecular weight and composition should be formed. Although several methods have heretofore been proposed for limiting the extent to which the reaction conditions may vary during a polymerization, and certain of the known methods are capable of producing polymers or copolymers of greater uniformity than are obtainable from similar starting materials by an ordinary batch polymerization procedure, the known methods either fail to maintain as nearly a constant set of polymerization conditions as is desired, or involve complex operating procedures which render the methods poorly suited to commercial practice. In only a few instances is sufficient information available, as to the combination of reaction conditions required for formation of a desired copolymer from a mixture of the corresponding monomers, to permit direct production of such copolymer in a form substantially uniform both in molecular weight and composition.

The aforementioned copending application, Serial No. 245,834, now Patent No. 2,769,804, discloses a continuous polymerization method which permits the production of homopolymers and copolymers that are of good uniformity, both in molecular weight and in composition, and which, in particular, permits the direct production of substantially uniform copolymers of predetermined and desired compositions. The method involves feeding monomeric material to a polymerization zone containing a large amount, relative to the inflowing monomeric material, of the polymerization mixture which is maintained at a substantially constant reaction temperature, withdrawing part of the polymerization mixture as a stream, vaporizing unreacted monomeric material and any other volatile ingredients, e.g. a solvent, if employed, from the mixture flowing from the polymerization zone, condensing the volatiles and returning them continuously to the polymerization zone, and withdrawing the residual polymer product. The polymerizer may be a vessel provided with an efficient agitator for rapidly distributing the inflowing monomeric material throughout the polymerization mixture, but is preferably a tubular reactor provided with a pump and connecting lines for repeatedly circulating a major portion of the reaction mixture through the same. In producing a desired copolymer, e.g. of styrene and methyl methacrylate, by such method using the preferred form of apparatus just mentioned, the monomeric materials, in relative proportions corresponding to those in which they are to be combined as the desired copolymer, are fed to the polymerization zone. A major portion of the polymerization mixture is recirculated continuously through the polymerization zone while maintaining the mixture in said zone at as nearly a constant polymerization temperature as possible. The rate, in grams per minute, of recirculation of the polymerization mixture is considerably greater than the rate of feed of the mixture of monomers. While continuing the operations just mentioned, a portion of the polymerization mixture is withdrawn and volatile material, e.g. unreacted monomeric material and a volatile solvent, if employed, are vaporized therefrom, condensed, and returned to the polymerization zone. The residual copolymer product is withdrawn from the system. The rates of feed of the monomers to the system and of withdrawal of the copolymer product are such that the mixture circulating through the polymerization zone is incompletely polymerized and contains a considerable amount of monomeric material, preferably an appreciable amount of each of the monomers.

In most instances, a mixture of two or more monomers reacts to form a copolymer of a different composition, i.e. containing the starting materials chemically combined with one another in proportions different from those of the monomers in the starting mixture. In other words, one of a pair of monomers usually has a greater tendency to enter into the copolymer molecule than does the other. By increasing the proportion of the less reactive monomer in the reaction mixture, the proportion thereof which becomes chemically combined in the copolymer can be increased. When the above described process for the formation of a copolymer by the method of the copending application, Serial No. 245,834, now Patent No. 2,769,804, is first started, the copolymer formed usually does not have a composition corresponding to the proportions of the monomers in the feed mixture, i.e. part of the less reactive monomer and preferably part, also, of the more reactive monomer, remains unconsumed and is vaporized, from the portion of the reaction mixture which is withdrawn for recovery of the copolymer product, and returned to the polymerization zone. As a result, the monomers present in the polymerization zone become enriched with the recycled less reactive monomer. This causes a gradual change in composition of the copolymer being formed until a condition of equilibrium is reached, in the polymerization system as a whole, such as to cause formation of a copolymer having a composition corresponding closely to that of the mixture of monomers being fed to the system. On continued operation of the process, the copolymer formed is of the composition just stated.

Although the above-described method of the copending application, Serial No. 245,834, now Patent No. 2,769,804, can be practiced on laboratory or plant scale to produce substantially uniform homopolymers or copolymers of a desired composition, adequate control of all of the polymerization conditions to prevent variations in the molecular weight, composition, or quality of the polymeric product becomes increasingly difficult as the scale of production is enlarged. The polymerization reactions are exothermic and external cooling, or heating, is, of itself, usually inadequate to maintain a substantially constant polymerization temperature when operating on a commercial scale. Although temperature runaways, due to spontaneous heating, can be prevented by increasing the rate of feed of monomers to the polymerization system or by injecting an inert solvent, e.g. benzene or toluene, into the polymerization mixture as a cooling fluid, such expedients change the concentration of polymer in the polymerization mixture and, of themselves, upset the condition of equilibrium that is desired and cause changes in the quality of polymer being formed.

An object of this invention is to provide an improved method for carrying out the polymerization of vinylidene compounds in a continuous manner which permits ready, rapid, and accurate control of all of the aforementioned reaction conditions to prevent occurrence of appreciable, i.e. more than slight, fluctuations or variations in the same regardless of the scale on which the polymerization is carried out. Another object is to provide such a method whereby homopolymers and copolymers which are nearly uniform in molecular weight, i.e. which comprise polymer molecules that fall for the most part within an unusually narrow range of molecular weights, may readily be produced. A more particular object is to provide such a method for the direct production of copolymers of two or more vinylidene compounds, which copolymers are of predetermined and desired compositions corresponding approximately to the ratio between the monomeric materials being fed from an external source to the polymerization system. A further object is to provide certain new combinations, or arrangements of known kinds of apparatus, for accomplishing the polymerizations in continuous manner under a nearly constant set of polymerization conditions. Other objects will be evident from the following description of the invention.

The method of the present invention is an improvement over the hereinbefore described method of the copending application, Serial No. 245,834, now Patent No. 2,769,804, and comprises the features as to procedure, polymerization conditions, and arrangements of apparatus, which are involved, or permitted, in practice of the method of said copending application. The invention adds, to the method and apparatus of said copending application, steps and devices which facilitate rapid and accurate control of the polymerization conditions to prevent occurrence of more than slight variations in the polymerization conditions.

The invention comprises the steps, in the above-described method of the copending application, Serial No. 245,834, now Patent No. 2,769,804, of feeding one or more streams of monomeric polymerizable material to a polymerization zone containing the polymerization mixture while agitating or circulating the latter to cause even distribution of the inflowing monomeric material in a larger amount by weight of the incompletely polymerized mixture and maintaining, or heating, the polymerization mixture at as nearly a constant reaction temperature as possible; withdrawing, as a stream, a portion of the polymerization mixture; vaporizing unreacted monomeric material and other volatile ingredients, if present, from the polymer product which is discharged from the system; and condensing the vaporized volatile material and returning it, as a stream, to the polymerization zone. The present invention adds further steps and means for: (a) circulating a portion of the polymerization mixture, at a rate which is varied automatically in response to a slight change in temperature of said mixture, from the polymerizer into admixture with the feed of monomeric material and through a temperature-control unit, i.e. a heat-exchanger, and back to the polymerizer; (b) automatically changing the rate at which heat is conducted to the temperature-control unit by flow of a heating or cooling fluid through a jacket or other chamber of said unit in response to the change in temperature of the mixture in the polymerizer; and (c) varying the rates (1) of feed of monomeric material from an external source to the polymerization system and (2) of withdrawal of a portion of the polymerization mixture from the polymerizer for recovery of the polymeric product therefrom, automatically in accordance with slight changes in the proportion of polymer in the polymerization mixture in a manner such as to prevent more than a slight change in the polymer content of the polymerization mixture. Means for automatically changing one variable condition, such as a liquid flow rate in a system for handling materials, in response to a change in another condition, e.g. the temperature or the viscosity of material present at any point in the system, are well known and need not be described in detail.

With regard to the above features (a) and (b) of the invention, it is, of course, well known to circulate a portion of a polymerization mixture through a heat-exchanger for purpose of preventing large changes in temperature of the mixture as a whole, but this conventional operation does not, of itself, permit as accurate and quickly-responsive temperature control as is desired for the present purpose. In such usual temperature-control operation, a reduction in temperature, or an increase in flow rate, of a cooling fluid fed to the heat-exchanger often fails to cool a spontaneously over-heated polymerization mixture to the desired polymerization temperature in less than from 10 to 20 minutes. For the present purpose, a more rapidly responsive temperature control operation is required. It has been found that by increasing the rate of circulation of part of a polymerization mixture from the polymerization zone through a heat-exchanger and back into the polymerization zone in response to a rise in temperature in said zone, the entire polymerization mixture is very rapidly, e.g. usually in less than one minute, cooled to the polymerization temperature which it is desired to maintain. It has further been found that by causing part of polymerization mixture which is being passed through the heat-exchanger to be recirculated directly through the latter, the rate of heat-exchange can be increased over that obtainable without such recirculation under otherwise similar operating conditions. The feature, in the invention, of introducing the feed of monomeric material into admixture with the portion of the polymerizate being circulated to, and through, the heat-exchanger is advantageous for each of several reasons. It dilutes and cools somewhat the portion of the polymerization mixture being circulated and at the same time brings the freshly added monomeric material to the temperature of the resulting mixture. More important, the inflowing monomeric material thins the circulated portion of the polymerization mixture in a manner which facilitates heat-exchange during flow through the temperature-control unit.

The feature of reducing the rate at which heat is conveyed by feeding a temperature-control fluid, e.g. a cooling fluid, to the heat-exchanger has an effect, of gradually lowering the temperature of the polymerization mixture, which supplements the rapid cooling obtained by the increase in rate of circulation of part of the polymerization mixture through the heat-exchanger, but this gradual cooling effect is of minor importance. This reduction of rate at which heat is conveyed by the temperature-control fluid fed to the heat-exchanger is of importance in that it results in an increase in cooling capacity of the heat-exchanger so that if, after overcoming one impulse toward spontaneous over-heating of the polymerization mixture, another such impulse occurs, there will be ample heat-exchange capacity to rapidly bring the polymerization mixture again to the desired reaction temperature. In other words, the feature of varying the rate at which heat is conveyed by the temperature-control fluid to or from the heat-exchanger in response to a change in temperature of the polymerization mixture is a precautionary measure only and, although highly desirable, can be omitted. Such change in rate at which heat is conveyed to or from the heat-exchanger by the temperature-control fluid can be accomplished by changing either the temperature of said fluid, or its rate of flow to the heat-exchanger.

The feature of varying the rates (1) of feed of monomeric material to the polymerization system and (2) of withdrawal of parts of the polymerization mixture from the polymerization zone in accordance with a slight change in polymer content of the mixture undergoing polymerization prevents an appreciable change in the concentration of polymeric material in the mixture in the polymerization zone. Over any considerable period, e.g. half hour or longer, of operation of the continuous polymerization process it is necessary that the rate, in pounds per hour, of feed of monomeric material to the polymerization system be the same as the rate of withdrawal of the devolatilized polymeric product from the system. It is in order to maintain this condition of balance that the rates of monomer feed and of withdrawal of material from the polymerization zone for devolatilization should be increased or decreased simultaneously in response to an increase or decrease, respectively, in the concentration of polymer in the polymerization mixture. Any of several physical characteristics, e.g. the viscosity, density, or index of refraction etc., of the polymerization mixture at a given point in the polymerization system can be determined continuously in known ways to detect a change in polymer concentration in the mixture in the polymerization one. As hereinbefore mentioned, means are well known for changing the flow rates in response to a change in any such characteristic of the polymerization mixture. In practice, a stream of the polymerization mixture is preferably circulated through a viscosimeter and the above-mentioned rates of flow are varied in accordance with slight changes in the viscosity of the mixture flowing through the viscosimeter.

It will be understood that when changes in the polymerization conditions, opposite to those mentioned above, start to occur, the above-described automatic control steps of the invention occur in such a manner as to prevent the changes from taking place more than briefly and to a slight extent. For instance, if the temperature of the polymerization mixture starts to drop, the rate of recirculation of a portion of the mixture to a cooling unit may automatically be decreased so as to permit spontaneous heating of the polymerization mixture to the desired reaction temperature. A number of ways in which the foregoing automatic control features of the invention may be practiced will be evident from the above description to those skilled in the art. All of the above automatic control steps of the invention are, inherently, in balance with one another. Thus a slight change in any of the several polymerization conditions, e.g. the temperature, or concentration of polymer, etc., of the polymerization mixture, causes changes in the rates of monomer feed, polymer withdrawal, or circulation through the heat-exchanger, etc., and often in all of these flow rates, which quickly re-establish the desired set of polymerization conditions.

The accompanying drawing shows, in schematic manner, two of the various arrangements of apparatus which may be employed in practice of the invention and indicates the directions of flow of materials through the apparatus. Each figure of the drawing is, in effect, a flow sheet. All of the individual pieces of apparatus are of kinds or types known in the art.

In FIG. 1, which represents a preferred arrangement of apparatus, the numeral 1 designates a storage tank for the liquid monomeric material to be polymerized. Pipe line 2 leads from tank 1 to a pump 3 and thence to the coil 4 of a heat-exchanger 5 having an inlet 6 to, and an outlet 7 from, the jacket thereof. A feed line 8, for a cooling fluid, such as water, at a temperature lower than the desired polymerization temperature, which line is provided with a valve 9, connects with the inlet 6 to the jacket of the heat-exchanger 5. A valve feed line 10 for a fluid, e.g. steam or super-heated steam, which is hotter than the cooling fluid and usually is at a temperature higher than the desired polymerization temperature, connects with line 8. A line 11, which is provided with a fitting having a temperature-responsive member, e.g. a thermocouple, not shown, in a well 12 of the same, connects with a pump 13. A line 14 from the pump 13 connects with a tubular polymerization vessel 15. A line 16, provided with a valve 17, e.g. a pressure-control valve, for varying the flow rate in a manner proportionate to a change in pressure on the liquid delivered from pump 13, connects with line 2, thereby forming a closed circuit through which part of the liquid delivered by pump 13 may be recycled through the heat-exchanger 5.

The polymerizer 15 is a tube having its ends connected with the inlet and outlet, respectively, of a pump 18 so that the tube and pump form a closed circuit through which a liquid polymerization mixture may be cycled. A line 19 from polymerizer 15, in which line are a pump 20 and a valve 21, connects with the line 2 leading to coil 4 of the heat-exchanger 5. Line 22 branches from line 19 and connects with a viscosimeter 23 for determining, or for producing an energy output or a mechanical movement proportionate to, the viscosity of the liquid flowing through the same. Viscosimeters suitable for the purpose are known. A suitable viscosimeter (not shown in detail) comprises a rotor in a tubular sleeve which is capable of rotation except for a spring mounted to limit the angle of rotation of the sleeve to an extent proportionate to the viscosity of liquid flowing through the viscosimeter. The movement of the sleeve can be applied, in known manner, to reset a valve for controlling a rate of liquid flow, e.g. in, or from, the polymerization system. A line 24 leads from the viscosimeter and connects with the aforementioned line 14. The tubular polymerizer 15 comprises a well 25 for a temperature responsive member, such as a thermocouple, not shown. A line 26, provided with a valve 27, leads from the polymerizer 15 to a devolatilizer 28. A number of suitable devolatilizers, for vaporizing volatile ingredients from a polymeric material, are known in the art. The devolatilizer 28 is provided with a valved outlet line 29 for the polymeric product and with a vapor line 30 which connects with a condenser 31. The latter is provided with a line 32 leading to a vacuum pump, not shown. A line 33 for recycle of the condensate, connects condenser 31 with the monomer feed line 2.

The apparatus of FIG. 1 also comprises known kinds of automatic control devices. The numeral 34 designates a device, i.e. a flow-controller, for resetting valve 27 to reduce the rate of flow of liquid through line 26 in response to a decrease in viscosity of liquid flowing through viscosimeter 22, or vice versa, the connections between these elements being indicated by broken lines. Element 35 is a temperature-responsive flow-control device which is connected, as indicated by broken lines, with: (1) a thermocouple or other temperature-responsive element in the well 25 of polymerizer 15; and (2) the valve 21 so as to reset the valve to permit an increase in rate of flow of liquid in line 19 in response to an increase in temperature of the liquid in polymerizer 15, or vice versa; and (3) a resetting element of another temperature-responsive flow-controller 36. The latter is connected, as indicated by broken lines, with a thermocouple or other temperature-responsive element in well 12 and with valve 9 in a manner permitting an increase in rate of flow of cooling fluid through line 8 in response to an increase in temperature of liquid flowing through line 11, or vice versa.

As indicated above, the temperature-responsive flow controller 35 varies the rate of flow of liquid through line 19 in response to a change in temperature of liquid in polymerizer 15 so that when the flow-controller is at rest, i.e. in a condition of balance, there is for each such temperature a given rate of flow of liquid through line 19. The valve 21 in line 19 is advantageously maintained partially open so as to permit at least some flow of material through the line. Except for its resetting element, the device 36 similarly controls the rate of flow of liquid through line 8 in response to changes in temperature of liquid in line 11 so that, when the device 36 is at rest, each such temperature of liquid in line 11 is characterized by a given rate of flow of liquid through line 8. The resetting element of flow-controller 36 permits a change in the rate of flow of liquid in line 8 which is characteristic of a particular temperature of liquid in line 11 when the device 36 is brought to a condition of balance such as to be at rest, i.e. inactive. For instance, if flow-controller 36 is at rest when liquid flowing through line 11 is at 100° C., a rise in temperature of the liquid to 101° C. actuates device 36 and causes it to reset valve 9 to increase the rate of flow of cooling fluid through line 8 to heat-exchanger 5 so as to bring the liquid flowing through line 11 again to 100° C. In other words, if the only temperature change which takes place is that just mentioned, the flow-controller 36 causes the temperature of liquid flowing through line 11 to return to the original value of 100° C. However, regardless of whether the temperature change just mentioned occurs, the condition for balance of flow-controller 36 may be reset, so as to cause it to bring the liquid flowing through line 11 to a different temperature, e.g. 85° C. The flow-controllers 35 and 36 are connected and arranged so that an increase in temperature of liquid in polymerizer 15 resets flow-controller 36 to cause the latter to seek to bring liquid in line 11 to a temperature lower than it would if not reset, and vice versa.

As hereinbefore mentioned, automatic control devices suitable for use as the flow-controllers 34, 35 and 36 and ways of connecting them so as to control flow rates in response to a change in temperature or other characteristic of material being handled are well known and need not be described in detail. However, it may be mentioned that a usual device, for controlling a flow rate in response to a change in temperature at a point in a system, comprises a thermocouple or thermopile, an amplifier for amplifying electric current or voltage from the thermocouple, a source of current or voltage to the amplifier, an electric bridge, e.g. a Wheatstone bridge, having a slide for varying the resistance in an arm of the bridge to bring the latter into balance, a motor connected with the bridge and actuated by current from the bridge when the latter is unbalanced, which motor is connected with the slide in a manner such as to move the latter in the direction necessary for balancing the bridge, and a mechanical connection between the slide and a valve for controlling the flow rate of a fluid, which valve is reset by movement of the slide. This known type of device is suitable for use as the flow-controller 35. When modified by adding a second variable resistance to another arm of the bridge so as to permit resetting of the position to which the first slide must be brought in order to balance the bridge, it may be used as the flow-controller 36. When the electric bridge of the first of the devices just mentioned is connected with another similar bridge so that unbalance in one bridge unbalances the other and both bridges can be electrically balanced against one another by moving the slide for varying the resistance in an arm of either bridge, and by connecting the slide of one bridge with the viscosity indicating arm of the viscosimeter 23 and the slide of the other bridge with valve 27, it can be used as the flow-controller 34. Flow-controllers of other known types can be used in place of those just described.

Figure 2:
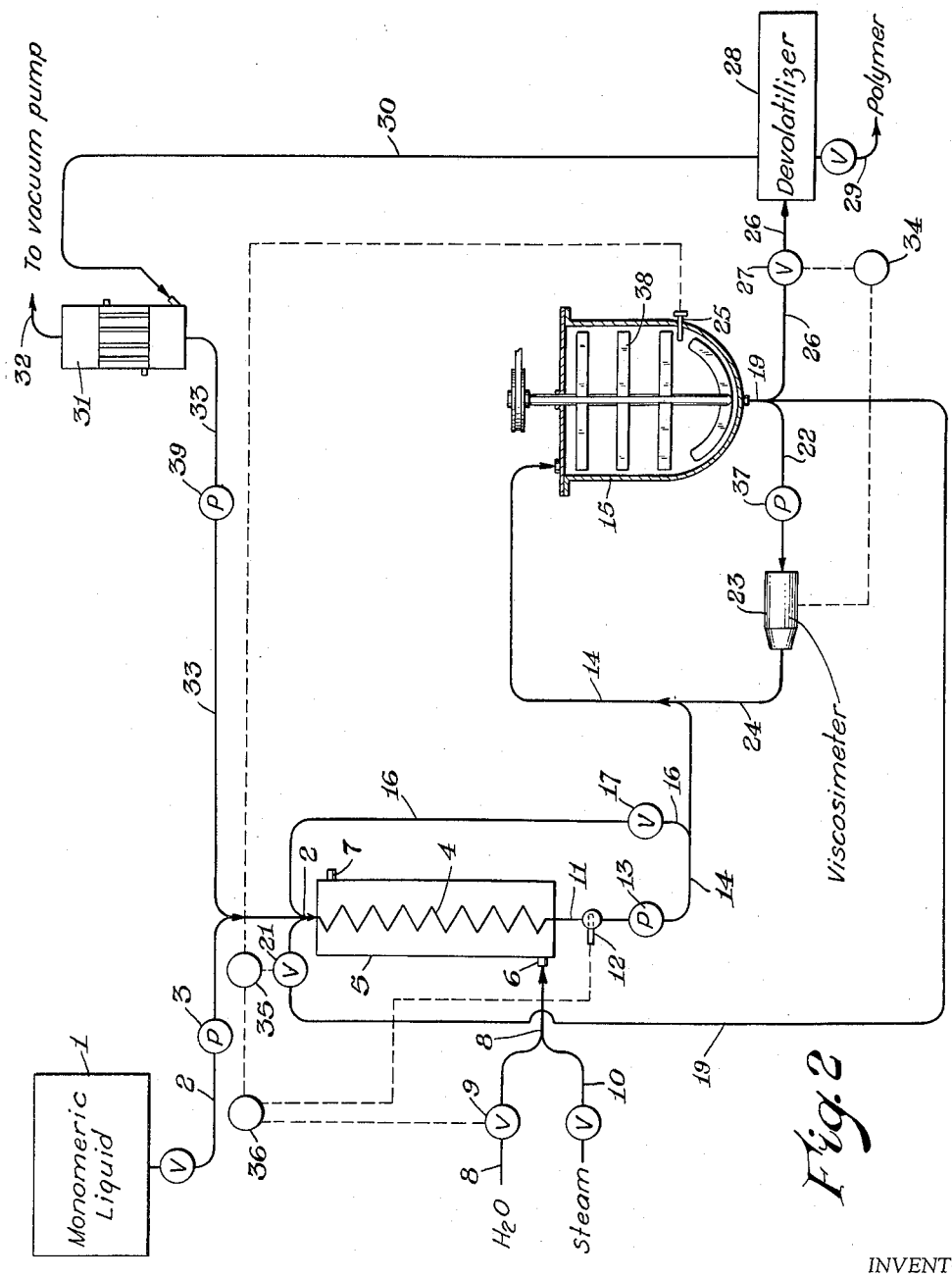

Except for substitution of a pot type of polymerizer 15, provided with a mechanical stirrer 38, in place of the tubular polymerizer 15 and pump 18 of FIG. 1, and except for insertion of a pump 37 in line 22 and a pump 39 in line 33, the arrangement of apparatus shown in FIG. 2 of the drawing is similar to that of FIG. 1.

In employing the apparatus of FIG. 1 to produce a copolymer of 80 weight percent styrene and 20 percent alpha-methylstyrene, a mixture of the monomers in the proportions just stated is placed in tank 1. The valve in line 2 is opened and pump 3 is operated to fill the coil 4 of heat-exchanger 5 and the polymerizer 15 and the several connecting lines with the monomers. When first starting the polymerization, valve 27 is preferably closed, valves 17 and 21 are at least partially opened, pumps 13, 18 and 20 are operated to cause circulation of the polymerization mixture, and water and steam are fed through lines 8 and 10 to the jacket of heat-exchanger 5 at temperatures and in proportions such as to heat the mixture of monomers to the desired polymerization temperature, e.g. in a range of from 70° to 200° C. The automatic flow-controller 34 is set so as to partially open valve 27 when the polymerization mixture becomes of a viscosity corresponding to the presence of a desired proportion, e.g. between 20 and 80 weight percent, of polymeric material therein.

When the polymerization mixture has been brought to the desired viscosity value, valve 27 opens, or is opened, to permit flow of part of the mixture to the devolatilizer 28, where it is heated, preferably under vacuum, to vaporize unconsumed monomeric material and any other volatile ingredients therefrom. The devolatilized copolymer is discharged through outlet line 29. The vacuum for the devolatilization is developed by a vacuum pump, not shown, which is connected by line 32 to the condenser 31. The vapors are liquefied in condenser 31 and the liquid drains into line 33. The vacuum which is applied prevents complete drainage of liquid from line 33, i.e. the liquid level in line 33 is sufficient for maintainance of the vacuum. The flow-controllers 34, 35 and 36 are energized so as to operate as hereinbefore described. The pumps 3, 13, 18 and 20 are preferably operated in a manner maintaining the mixture in polymerizer 15 at a substantially constant pressure. Accordingly, part of the polymerization mixture is automatically withdrawn from polymerizer 15 to the devolatilizer 28 at a rate such as to maintain the the concentration of polymer therein substantially constant, and the starting mixture of styrene and alpha-methylstyrene is automatically fed to the polymerization system at a rate such as to replace the copolymer product withdrawn from the system. The rates of feed of monomers from tank 1 and of flow of part of the polymerization mixture to devolatilizer 28 are sufficient to prevent complete polymerization of the monomers. The recovered monomeric material and any other volatile ingredients, e.g. a solvent if employed, are automatically recycled in the system.

When the process, as just described, is first placed in operation, the copolymer product usually does not correspond in composition to the monomeric feed mixture, but as operation is continued the composition of the copolymer being formed changes until it corresponds closely to that of the feed mixture, at which time the polymerization system as a whole is in balance. During further operation, the aforementioned automatic control steps and devices prevent more than slight and brief changes in any of the polymerization conditions and the copolymer product has a composition corresponding closely to the proportions of monomers in the feed mixture and is made up for the most part of copolymer molecules of close to the same molecular weight. Thus, an exceptionally uniform copolymer of 80 percent styrene and 20 percent alpha-methylstyrene is produced from the mixture of the monomers in these same proportions.

Except for employment of a pot-type of polymerizer, instead of a tubular polymerizer, with rotation of its stirrer 38 and except for operation of the pumps 37 and 39 as well as the other devices indicated, the procedure in carrying out a polymerization in continuous manner using the apparatus of FIG. 2 of the drawing is similar to that described above with respect to FIG. 1.

The method, as just described, can be applied with advantage in making homopolymers or copolymers of any of the polymerizable vinylidene compounds hereinbefore mentioned. It is applied with particular advantage in polymerizing or copolymerizing alkenyl aromatic compounds such as styrene, vinyltoluene, or chlorostyrene, or mixtures of one or more of these compounds with one another or with a lesser amount by weight of other vinylidene compounds such as methyl methacrylate, vinyl acetate, or maleic anhydride, etc., to obtain thermoplastic products which are of good uniformity, e.g. in molecular weight and composition, and are solid at room temperature. In some instances, e.g. when employing maleic anhydride as a starting material, a volatile inert organic solvent such as benzene, toluene, or xylene, etc., may advantageously be present in the mixture being polymerized. A volatile solvent, when employed, is recycled together with the recovered monomers and, after adding the desired proportion of solvent, further amounts of solvent are not added except when required to replace minor amounts of solvent lost from the system. In most instances, the polymerizations are carried out en masse, i.e. in the absence of solvents.

The following examples describe ways of practicing the invention and illustrate certain of its advantages, but are not to be construed as limiting its scope.

EXAMPLE 1

Styrene was polymerized in continuous manner using an arrangement of apparatus which was similar to that illustrated by FIG. 1 of the drawings, except that flow-controller 34, which is actuated by viscosimeter 23, was connected to operate the valve in feed line 2 instead of valve 27 and the latter was operated automatically by a conventional pressure-control mechanism to open when the mixture in polymerizer 15 was brought to a pressure of about 35 pounds per square inch gauge and thereafter to maintain the mixture at a constant pressure. The pumps 3, 13, 18 and 20 were operated to fill polymerizer 15 and the lines leading thereto with styrene and to develop sufficient pressure to partially open valve 27 and cause flow of styrene into devolatilizer 28. The latter was heated and vacuum was applied through line 32, the valves in lines 29 and 33 being closed until line 33 was filled with the styrene distilled from devolatilizer 27. The valve in line 32 was then opened to permit recirculation of the condensed styrene. Water and steam under pressure were fed through lines 8 and 10 to the jacket of heat-exchanger 5 so as to heat the styrene to a polymerization temperature in the vicinity of 80–100° C. When the polymerization had proceeded to a stage at which devolatilized polystyrene had accumulated in devolatilizer 28 it was discharged therefrom through line 29 at the rate at which it tended to accumulate; flow-controller 34 was set to bring the concentration of polystyrene in the mixture in polymerizer to from 15 to about 35 percent by weight; flow-controllers 35 and 36 were set to bring the mixture in polymerizer 15 to a temperature of 126° C.; and the flow-controllers were placed in operation. On continued operation, the several flow-controllers functioned to bring the mixture, in a few hours, to the set of polymerization conditions just stated and to prevent further appreciable variations in the polymerization conditions. During 24 hours of continuous operation, after reaching the polymerization conditions just stated, the temperature of the mixture at the point of measurement in polymerizer 15 varied by less than 1° C., and apparently only momentarily by about 0.5° C., from the desired polymerization temperature of 126° C. and the viscosimeter readings (not calibrated, but corresponding to the presence of about 35 weight percent of polystyrene in the mixture in polymerizer 15) varied from 8.5 to 9 and was most of the time, about 8.7. When the polystyrene being produced was that formed under the above-stated polymerization conditions, a sample of the devolatilized polystyrene product was tested by the method of ASTM D48–37 and found to have a heat-distortion temperature of 89° C. This is several degrees higher than that of the molding grade of polystyrene, made by other methods, available on the market.

EXAMPLE 2

Styrene was polymerized in continuous manner using the preferred arrangement of apparatus illustrated in FIG. 1 of the drawing, i.e. having the flow-controller 34 connected to control valve 27 so as to maintain the viscosity of the mixture in polymerizer 15 substantially constant and operating the feed pump 3 to maintain the polymerization mixture at a constant pressure. Except for the features just mentioned, the procedure was similar to that described in Example 1. After bringing the polymerization mixture to the desired set of polymerization conditions, the latter were maintained substantially constant by the cooperative action of the several flow meters 34, 35 and 36. Clear, colorless polystyrene of a good molding grade was produced.

EXAMPLE 3

In each of several separate experiments, a mixture of liquid polymerizable vinylidene compounds was polymerized in continuous manner. Except for the employment of mixtures of different vinylidene compounds as the feed material to the polymerization system, and the specific set of polymerization conditions established and automatically maintained in each of the experiments, the procedure and arrangement of apparatus in carrying out these experiments were similar to those described in Example 1. After carrying out each continuous polymerization for several hours to establish the desired polymerization conditions and to purge the system of polymeric material formed in early stages of the process, the copolymer being produced contained the vinylidene compounds chemically combined in approximately the proportions in which they were present in the feed mixture. The liquid polymerizable vinylidene compounds employed in the several experiments were styrene, the unsaturated dimer of alpha-methylstyrene, and maleic anhydride. The following table gives the percent by weight of each of these compounds in the feed mixture employed in each experiment; the polymerization conditions, of temperature and weight percent polymer in the polymerization mixture, which were established and automatically maintained in each experiment; and the approximate composition of the copolymer product obtained in each experiment, the weight percent of volatile ingredients (presumably unconsumed starting material) retained in each product, and the heat-distortion temperature and tensile strength, in pounds per square inch of cross section, for each copolymer product. In the table, styrene is abbreviated as "S," the unsaturated dimer of alpha-methylstyrene as "AMSD," and maleic anhydride is abbreviated as "MA."

2. A continuous method for the polymerization of vinylidene compounds which comprises feeding at least one polymerizable liquid monoethylenically unsaturated vinylidene compound as a stream into admixture with a portion of a heated polymerization mixture that comprises the same together with a polymer thereof and that is being withdrawn as a stream from a polymerization zone for such dilution with the feed material, passing the resulting mixture through a heat-exchanger which is operated to Table

| Run No. | Feed Mixture | | | Polymerization Conditions | | Copolymer Product | | | | | |
|---|---|---|---|---|---|---|---|---|---|---|---|
| | S, Percent | AMSD, Percent | MA, Percent | Temp., °C. | Percent Polymer Conc. | Approximate Composition | | | Percent Volatiles In— | Heat Distortion Temp., °C. | Tensile Strength, lbs./sq. in. |
| | | | | | | S, Percent | AMSD, Percent | MA, Percent | | | |
| 1 | 99.5 | 0 | 0.5 | 122 | 30.7 | 99.5 | 0 | 0.5 | 0.37 | 87 | 9,020 |
| 2 | 97.5 | 0.5 | 2.0 | 128 | 43.3 | 97.5 | 0.5 | 2.0 | 0.29 | 91 | 8,170 |
| 3 | 98.0 | 1.0 | 1.0 | 132 | 44.3 | 98.0 | 1.0 | 1.0 | 1.00 | 83 | 6,430 |
| 4 | 96.2 | 0.8 | 3.0 | 136 | 44.2 | 96.2 | 0.8 | 3.0 | 0.50 | 87 | 6,120 |

We claim:
1. A continuous method for the polymerization of vinylidene compounds which comprises feeding at least one polymerizable liquid vinylidene compound, including a polymerizable ar-monoalkenyl aromatic compound having from 2 to 3 carbon atoms in the alkenyl radical thereof, as a stream into admixture with a portion of a heated polymerization mixture that comprises the same together with a polymer thereof and that is being withdrawn as a stream from a polymerization zone for such dilution with the feed material, passing the resulting mixture through a heat exchanger which is operated to bring the mixture to a temperature such that, upon subsequent passage into the polymerization zone, it brings the mixture therein to the desired polymerization temperature, which is above room temperature, then pasing said resulting mixture into the polymerization zone and intimately admixing it with a larger proportion by weight of a polymerization mixture, which is in said zone and which comprises the same kinds of ingredients as said resulting mixture which is passed into said zone, withdrawing a portion of the polymerization mixture as a stream from the polymerization zone and distilling volatile material therefrom to obtain a residue of the polymeric product, and returning the distillate to the polymerization zone, and, while continuing the operations just stated, maintaining the mixture in the polymerization zone under a nearly constant set of polymerization conditions by varying the rate of feed of the starting material to the polymerization system and correspondingly the rate of withdrawal of polymeric product from the system in response to changes in the concentration of polymer in the mixture in the polymerization zone in a manner such that said rates are increased with increase in said concentration of polymer above a given value and are decreased with decrease in the concentration of polymer below the given value and the polymer-concentration of the mixture in the polymerization zone is thereby prevented from changing to more than a slight extent from the given value, and at the same time varying the rate of circulation of part of the polymerization mixture through the heat-exchanger in response to changes in the temperature of the mixture in the polymerization zone in a manner such that the rate of circulation is increased with increase in the temperautre above a given value and is decreased with decrease in the temperature below the given value and the temperature of the mixture in the polymerization zone, at a point remote from any point of feed of polymerizable material to the polymerization zone, is thereby prevented from changing by more than about 1° C. from the given value.

2. A continuous method for the polymerization of vinylidene compounds which comprises feeding at least one polymerizable liquid monoethylenically unsaturated vinylidene compound as a stream into admixture with a portion of a heated polymerization mixture that comprises the same together with a polymer thereof and that is being withdrawn as a stream from a polymerization zone for such dilution with the feed material, passing the resulting mixture through a heat-exchanger which is operated to bring the mixture to a temperature such that, upon subsequent passage into the polymerization zone, it brings the mixture therein to the desired polymerization temperature, which is above room temperature, then passing said resulting mixture into the polymerization zone and intimately admixing it with a larger proportion by weight of a polymerization mixture which is in said zone and which comprises the same kinds of ingredients as said resulting mixture which is passed into said zone, withdrawing a portion of the polymerization mixture as a stream from the polymerization zone and distilling volatile material therefrom to obtain a residue of the polymeric product, and returning the distillate to the polymerization zone, and, while continuing the operations just stated, maintaining the mixture in the polymerization zone under a nearly constant set of polymerization conditions by varying the rate of feed of the starting material to the polymerization system and correspondingly the rate of withdrawal of polymeric product from the system in response to changes in the concentration of polymer in the mixture in the polymerization zone in a manner such that said rates are increased with increase in said concentration of polymer above a given value and are decreased with decrease in the concentration of polymer below the given value and the polymer-concentration of the mixture in the polymerization zone is thereby prevented from changing to more than a slight extent from the given value, and at the same time varying the rate of circulation of part of the polymerization mixture through the heat-exchanger in response to changes in the temperature of the mixture in the polymerization zone in a manner such that the rate of circulation is increased with increase in the temperature above a given value and is decreased with decrease in the temperature below the given temperature and the temperature of the mixture in the polymerization zone, at a point remote from any point of feed of polymerizable material to the polymerization zone, is thereby prevented from changing by more than about 1° C. from the given value.

3. A method, as claimed in claim 1, wherein a cooling fluid and a heating fluid are simultaneously fed to the heat-exchanger and are there brought into indirect heat-exchange relationship with the polymerization mixture flowing through the heat-exchanger, and the ratio by weight of the cooling fluid to the heating fluid is increased in response to a rise in temperature, and is decreased in response to a drop in temperature, of the portion of the polymerization mixture flowing from the heat-exchanger.

4. A method, as claimed in claim 3, wherein the ratio by weight of cooling fluid to heating fluid being fed to the heat-exchanger is also increased in response to a rise, and is decreased in response to a drop, in the temperature of the mixture in the polymerization zone.

5. A method, as claimed in claim 1, wherein a side stream of the portion of the polymerization mixture flowing from the heat-exchanger is recirculated through the heat-exchanger while another stream of the polymerization mixture flowing from the heat-exchanger is being fed to the polymerization zone.

6. A method, as claimed in claim 1, wherein a single liquid vinylidene compound is fed to the polymerization system.

7. A method as claimed in claim 1, wherein a copolymerizable mixture of vinylidene compounds is fed to the polymerization system and there is produced a copolymer of said compounds in approximately the same proportions as in the feed mixture.

References Cited in the file of this patent

UNITED STATES PATENTS

| | | |
|---|---|---|
| 2,420,330 | Shriver et al. | May 13, 1947 |
| 2,497,828 | Young | Feb. 14, 1950 |
| 2,554,280 | Tracy | May 22, 1951 |
| 2,583,420 | Garber | Jan. 22, 1952 |
| 2,769,804 | Hanson | Nov. 6, 1956 |

FOREIGN PATENTS

| | | |
|---|---|---|
| 697,991 | Great Britain | Oct. 7, 1953 |
| 499,680 | Canada | Feb. 2, 1954 |

OTHER REFERENCES

Minneapolis-Honeywell Chem. Eng. 58, p. 49 (August 1951).

Perry: Chem. Eng. Handbook, pp. 463, 478–9, 3rd ed., McGraw-Hill, 1950.